Oct. 13, 1925.
J. H. GRAHAM
1,557,359
SPINDLE FOR BICYCLE PEDALS
Filed Sept. 22, 1924
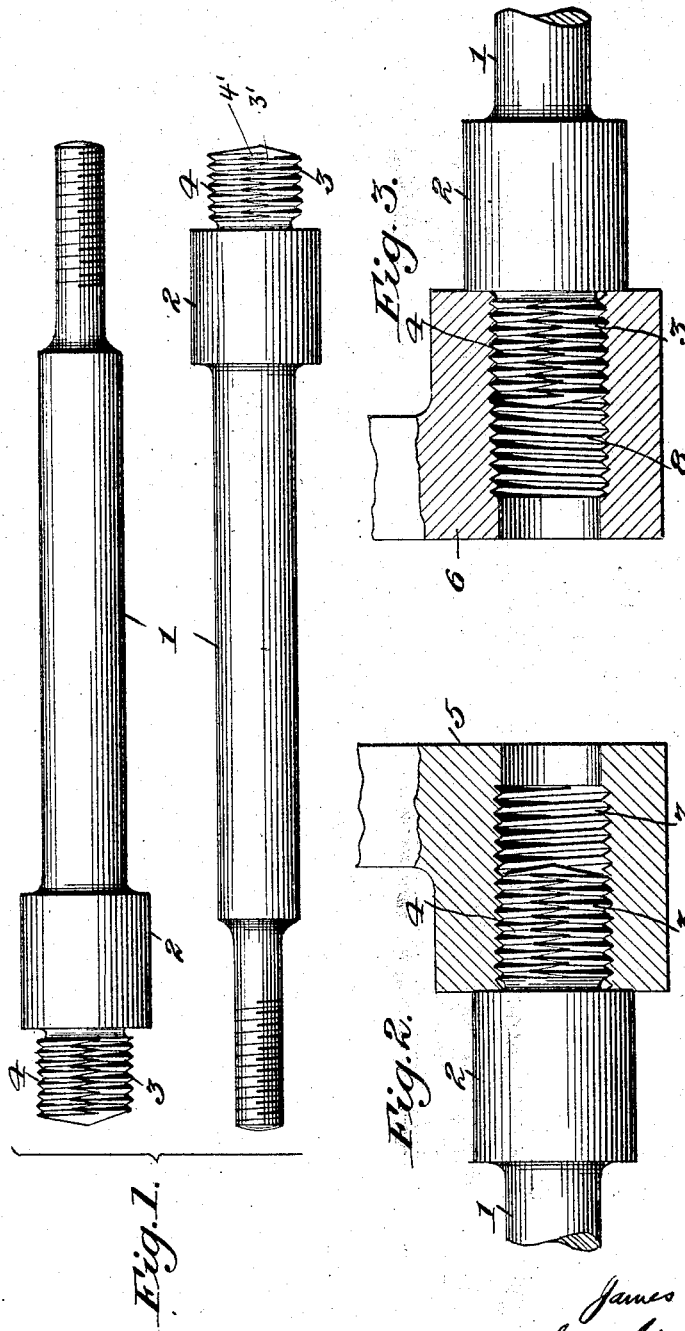
Inventor:
James H. Graham
by Geo. H. Evans
Att'y.

Patented Oct. 13, 1925.

1,557,359

UNITED STATES PATENT OFFICE.

JAMES H. GRAHAM, OF TORRINGTON, CONNECTICUT.

SPINDLE FOR BICYCLE PEDALS.

Application filed September 22, 1924. Serial No. 739,121.

*To all whom it may concern:*

Be it known that I, JAMES H. GRAHAM, a citizen of the United States, residing at Torrington, in the county of Litchfield and State of Connecticut, have invented certain new and useful Improvements in Spindles for Bicycle Pedals, of which the following is a specification.

My invention relates to spindles for bicycle pedals and the like.

The object of the invention is to provide a spindle provided at its attaching end with right and left intersecting screw threads so that it may be screwed into either a right or a left threaded opening.

This object I accomplish by the construction shown in the accompanying drawing, in which:

Fig. 1 shows enlarged elevations of opposite sides of the improved spindle, showing the intersecting right and left threads.

Figs. 2 and 3 show in section portions of right and left cranks provided as usual with right and left threaded openings and two of my spindles, either of which is adapted to screw into either of said threaded openings, and Fig. 4 is an enlarged elevation of the attaching end of the spindle.

The spindle 1 is provided as usual with the enlarged collar 2 and is shaped therebeyond towards its outer end, according to the style of pedal it is to carry. The inner or stud end of the spindle is provided with intersecting right and left screw threads 3 and 4, in order that the spindle may be screwed to either pedal crank 5 or 6, which are provided, respectively, with a right and a left screw threaded hole 7 and 8. There is no difficulty in fitting the right and left threads of the spindle to either the right or left threaded crank hanger bores 7, 8. Considering either of these bores, its thread has ridges and grooves which are continuous and unbroken in theory. The grooves only on the spindle are unbroken, as the ridges taper down to nothing at each end, as at 3', 4', which is at point of intersection, and each ridge extends approximately half way around the spindle.

Two of these oppositely tapering and overlapping portions 3', 4' at the point of intersection are equal to the width of one tooth or rib 3 or 4 therebeyond, which allows the spindle threads to continue in engagement with the threaded bore without jamming during the further rotation of the spindle. This is true whether the spindle is entering the right or left crank hanger bore.

In places where spindles must be supplied in pairs, rights and lefts, as in pedals, for instance, considerable trouble and expense are involved in such construction. The manufacturer must have two sets of threading devices, one for the right spindle and the other for the left, the right and left axles must be properly paired and shipped in pairs; the workman must first try one and then the other of the pair to find which one will fit the right or the left threaded treadle hole in applying the treadles to the cranks.

With my improved spindle no pairing is required, since the intersecting right and left threaded attaching end renders the manufacturing and shipping of the spindles in right and left pairs wholly unnecessary. All that is necessary in attaching a pedal having my improved spindle is to screw it to the right in the right threaded hole and to the left in the left threaded hole without the necessity of distinguishing between a right and a left threaded end as heretofore and no more bother about pairs.

In purchasing a new spindle there is no need to find out first whether one needs a spindle with a right or a left thread, as is now the case, since my improvement supplies both threads at the same place in intersecting relation.

The user now has to order pedals in pairs, one right and the other left, just as in purchasing a pair of shoes, and they have to be put into right and left crank on the bicycle, while in my double threaded spindle each axle will fit either crank.

What I claim is:

1. A pedal spindle provided at its attaching end with intersecting right and left threads, thereby adapting it for screwing into either a right or left crank.

2. The combination with right and left cranks having right and left threaded spindle holes, respectively, of spindles having intersecting right and left threads adapting them to be threaded into either of the crank holes.

3. A bicycle pedal mechanism comprising, in combination, a pair of pedal cranks provided with spindle holes, and pedals provided with spindles; the said spindle holes and spindles having interlocking connections, those on the spindles being double and adapted to interlock with those of either spindle hole and thus avoid the necessity of forming the spindles in right and left threaded pairs.

In testimony whereof I affix my signature.

JAMES H. GRAHAM.